H. K. HEDGES.
TRACTOR DRIVE WHEEL.
APPLICATION FILED AUG. 27, 1917.

1,264,646.

Patented Apr. 30, 1918.

INVENTOR
HARRY K. HEDGES
BY
Hazard & Miller
ATT'YS.

UNITED STATES PATENT OFFICE.

HARRY K. HEDGES, OF LOS ANGELES, CALIFORNIA.

TRACTOR DRIVE-WHEEL.

1,264,646.

Specification of Letters Patent.   Patented Apr. 30, 1918.

Application filed August 27, 1917.   Serial No. 188,478.

*To all whom it may concern:*

Be it known that I, HARRY K. HEDGES, a citizen of the United States, residing at Los Angeles, in the county of Los Angeles and State of California, have invented new and useful Improvements in Tractor Drive-Wheels, of which the following is a specification.

My object is to provide a drive wheel construction for tractors and the like, in which the load supporting points may shift forwardly and upwardly or backwardly and upwardly from the center of the wheel, and in which the drive wheel is geared to the driving axle, so as to thus shift the load supporting points, thereby applying the force of the weight of the load to the rotation of the wheel.

An important feature of my invention is the floating and elastic connection between the drive wheel and the driving axle whereby one may move in any direction in a concentric plane relative to the other, this elasticity serving to absorb violent shocks, as when the drive wheel strikes an immovable object.

Another important feature is the geared and elastic connection between the drive wheel and the driving axle by which the load may be chugged back and forth to start the drive wheel by momentum and weight.

Other objects and advantages will be obvious.

In the drawings I have shown a single tractor drive wheel embodying the principles of my invention, the driving axle and axle housing being broken away, and it being understood that a similar construction should preferably be provided at the other end of the driving axle and that the axle may be driven in any practical manner.

Figure 1:
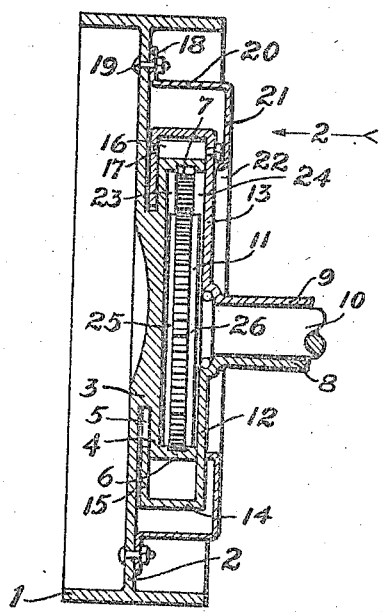
Figure 1 is a vertical diametrical sectional detail on the line 1—1 of Fig. 2.

The wheel rim 1 is preferably formed integral with the web 2, said web occupying the position and serving the function of the usual hub and spokes. The rim 1 and web 2 may be cast, or they may be of any construction providing the required strength. No hub or axle box is required. The neck 3 extends inwardly from the web 2 concentric to the rim 1. The retaining head 4 extends inwardly from the neck 3, there being a finished channel 5 between the head 4 and the web 2 around the neck 3. The internal gear 6 extends inwardly from the periphery of the head 4, the gear teeth 7 being concentric to the rim 1. The neck 3, the head 4, and the gear 6 may be all cast integral with the web 2 or they may be built up in any desired manner.

The axle housing is formed in two parts and consists of the lower half housing 8 and the upper half housing 9. The driving axle 10 is mounted in this housing and has a spur gear 11 fixed upon its extreme end and meshing with the internal gear 6. A web 12 extends from the end of the lower half housing 8 and a similar web 13 extends from the end of the upper half housing 9, said webs 12 and 13 being parallel with the web 2 and forming a disk covering the inner sides of the gears 6 and 11. An annular flange 14 extends outwardly from the periphery of this disk 12 and 13, the diameter of the flange 14 being considerably greater than the diameter of the gear 6. The retaining flange 15 extends inwardly from the outer edge of the flange 14 parallel with the web 2 and the disk 12 and 13, said flange 15 being finished to fit in the finished channel 5.

A series of rollers 16 is placed between the web 13 and the retaining flange 15, and spindles 17 are inserted through the web and flange and through the rollers to make antifriction bearings resting upon the upper half of the head 4 and gear 6. The rollers 16 serve to support the load when the parts are at a stand-still, thereby holding the spur gear 11 from pressing downwardly upon the gear 6. The line of the rollers 16 is eccentric to the gear 6 so that only two or three of the rollers will be in contact at any one time.

A dust-guard is provided, said dust-guard consisting of the attaching flange 18 secured to the web 2 by bolts 19, the annular spacing wall 20 extending inwardly from the flange 18, the housing flange 21 extending toward the axle from the inner edge of the wall 20, and the bearing flange 22 extending from the inner edge of the flange 21 against the disk 12 and 13 so as to effectually exclude dirt from the gears and wearing surfaces.

The opening in the retaining flange 15 is considerably larger than the neck 3 and the flange 14 is correspondingly larger than the periphery of the head 4 and the gear 6, so as to form a transversely floating connection between the wheel and the axle and at the same time hold the wheel in running line relative to the axle. The friction between the retaining flange 15 and the sides of the channel 5 may be relieved by anti-friction rollers or balls to any desired extent. The annular flange 14 and the retaining flange 15 must be of sufficient strength to stand the end thrust usually withstood by the axle spindle and axle box, and the retaining flange 15 should be finished to form a good fit in the finished channel 5 to prevent shaking and rattling.

The lost motion between the annular flange 14 and the periphery of the head 4 may be increased or decreased to any desired extent and if desired the lost motion may be entirely eliminated by placing the rollers 16 entirely around and in contact with the periphery of the head 4. It is thought that a considerable lost motion is desirable.

When the axle 10 is driven the spur gear 11 will climb forwardly or backwardly and upwardly in the internal gear 6 and this will transfer the load from the rollers 16 to the contacting teeth of the two gears and the point of contact will be shifted forwardly or backwardly of the center of the wheel and upwardly until the wheel rolls. This will place the load upon the gear 6 in front of the center of the wheel and the load will assist in rotating the wheel.

When the wheels are stuck and will not start easily, the driving axle may be reversed to move the load backwardly and then changed to move the load forwardly, thus applying the momentum of the moving load to start the wheel. In this way the load may be used as a hammer to any desired extent.

When a moderate load is running freely, the pressure will be divided between the rollers 16 and the contacting gear teeth and as the resistance to the wheels increases the pressure upon the contacting gear teeth will increase and the pressure upon the rollers decrease. In this way the force of the weight and momentum of the load rotates the driving wheels.

Especial attention is called to the transversely floating and elastic connection between the driving axle and the driving wheel as distinguished from the usual connection where the axle fits closely in an axle box in the hub of a wheel. This floating and elastic connection will absorb violent shocks, as when the wheel strikes an obstruction, and will reduce the liability of damage.

Figure 3:
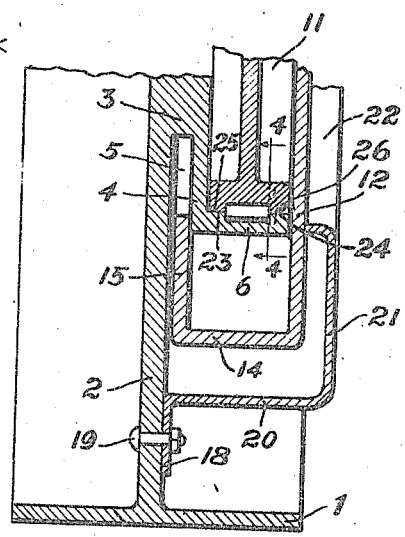
Fig. 3 is an enlarged fragmentary sectional detail similar to Fig. 1 drawn especially for the purpose of showing the track rims for supporting the weight and protecting the gear teeth.
Figure 2:
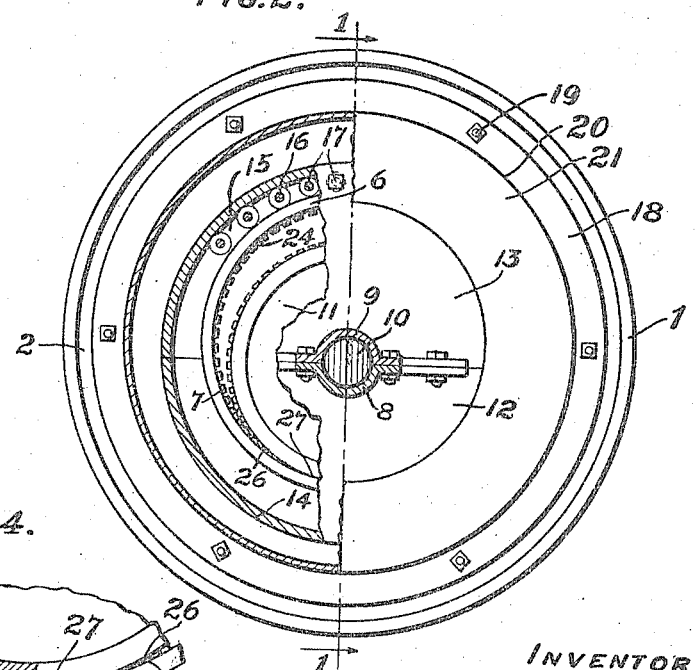
Fig. 2 is an inside elevation as indicated by the arrow —2— in Fig. 1, parts being broken away and sectioned to show the details.
Figure 4:
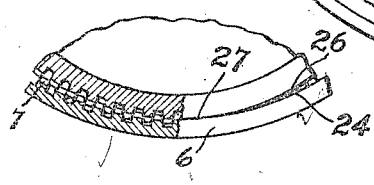
Fig. 4 is a fragmentary sectional detail on the line 4—4 of Fig. 3.

Referring especially to Figs. 3 and 4, track rims 23 and 24 are formed on opposite sides of the gear teeth 7 and meeting track rims 25 and 26 are formed on opposite sides of the teeth of the gear 11, said track rims 25 and 26 running upon the track rims 23 and 24 and the contacting line 27 being on the pitch line of the gears. These track rims will hold the gear teeth from meshing to the bottoms of the grooves between the teeth and will support the load and materially protect the gear teeth from grinding upon each other, especially at the bottoms of the grooves. The relation between the track rims and the rollers 16 will be such that one assists the other in supporting the load and sustaining the wear. If desired, either the rollers or track rim construction may be omitted.

Various changes may be made in the construction and arrangement of parts without departing from the spirit of my invention as set up in the following claims:

I claim:

1. A tractor drive wheel construction comprising a wheel, a neck extending from the wheel within the periphery and concentric therewith, a head upon the neck and forming a channel around the neck, an internal gear extending from the head, an axle housing, a driving axle in the axle housing, a spur gear upon the axle in mesh with the internal gear, a web extending from the end of the axle housing, an annular flange extending from the periphery of the web, and a retaining flange extending from the annular flange into the channel.

2. A tractor drive wheel construction comprising a wheel, a neck extending from the wheel within the periphery and concentric therewith, a head upon the neck and forming a channel around the neck, an internal gear extending from the head, an axle housing, a driving axle in the axle housing, a spur gear upon the axle in mesh with the internal gear, a web extending from the end of the axle housing, an annular flange extending from the periphery of the web, a retaining flange extending from the annular flange into the channel, and a dust guard attached to the wheel and extending inwardly over the joint between the wheel and the annular flange and bearing against the web.

3. A tractor drive wheel construction comprising a wheel, a neck extending from the wheel within the periphery and concentric therewith, a head upon the neck and forming a channel around the neck, an internal gear extending from the head, an axle housing, a driving axle in the axle housing, a spur gear upon the axle in mesh with the internal gear, a web extending from the end of the axle housing to beyond the periphery of the internal gear, an annular flange extending from the periphery of the web, a retaining flange extending from the annular flange into the channel, and bearing rollers mounted inside of the annular flange to engage the periphery of the internal gear and head.

4. A tractor drive wheel construction comprising a wheel, a neck extending from the wheel within the periphery and concentric therewith, a head upon the neck and forming a channel around the neck, an internal gear extending from the head, an axle housing, a driving axle in the axle housing, a spur gear upon the axle in mesh with the internal gear, track rims on each side of the internal gear, and track rims upon each side of the spur gear to run upon the internal gear rims.

In testimony whereof I have signed my name to this specification.

HARRY K. HEDGES.